April 25, 1950     J. W. BEECHER     2,505,456

PROTECTIVE APPARATUS FOR DIFFERENTIAL FLUID METERS

Filed March 4, 1946

INVENTOR.
JOHN W. BEECHER

BY

*Fred'k Schuetz*

ATTORNEY.

Patented Apr. 25, 1950

2,505,456

UNITED STATES PATENT OFFICE 2,505,456

PROTECTIVE APPARATUS FOR DIFFERENTIAL FLUID METERS

John W. Beecher, Waterbury, Conn., assignor to The Bristol Company, Waterbury, Conn., a corporation of Connecticut Application March 4, 1946, Serial No. 651,813

7 Claims. (Cl. 220—89)

This invention relates to a device for protecting differential manometers against abnormal pressure differentials consequent upon failure or breakage of the conduits or piping systems to which they are connected, and more especially to a device suitable for the protection of differential manometers when used in conjunction with orifices or other constricting devices for the purpose of determining the rate of flow of a fluid through conduits.

In a very large proportion of the installations of differential manometers for the purpose of determining the pressure developed across a constriction in a pipe line or conduit, the static pressure existing in the piping system is much greater than the maximum differential pressure corresponding to the full range of the instrument. When operating conditions are normal, the manometer is not at any time subjected to a differential pressure in excess of that to which its measuring range is adapted; and, while the parts of the instrument may be directly subjected to the static pressure existing in the line, this appears only as a pressure differing from that of the surrounding atmosphere, and is easily resisted by the heavy casing of the instrument. So long as the piping system is intact and the rate of flow through the measuring constriction does not greatly exceed that for which the instrument is designed, the pressures applied to the delicate measuring element of the manometer (which may be in the nature of a bellows, a Bourdon spring, or a mercury column) are neutralized, with exception of the differential due to fluid flow through the constriction, which differential is determined by the manometer and may be interpreted as a measure of the rate of flow.

In the installation of flow meters, it is frequently expedient to locate the manometer unit at a considerable distance from the main pipe line in which the flow is to be determined. The connecting line (generally a pair of relatively small and fragile pipes or tubes) is thus likely to be subjected to mechanical damage or to unauthorized disconnection such as would be highly improbable in the part of the piping system immediately adjacent to the instrument. In the event of such a breakage or accidental disconnection, there is likely to develop either an unbalanced pressure in the manometer or a flow of the measured fluid through the system in such a manner as to set up pressures which may be damaging or even destructive to the manometer element.

It is an object of the present invention to provide means whereby, in the event of development of an excessive differential pressure across a manometer or the like, the meter will be by-passed and the pressures on the two sides of the meter equalized before the differential value can rise to a dangerous magnitude.

It is a further object of the invention to provide means of the aforesaid nature which shall afford a permanent record of the condition responsible for development of the objectionable pressure differential which caused its operation, thereby facilitating a knowledge of the history of an accident or other condition leading up to failure in the piping system.

A still further object of the invention is to provide means of the aforesaid nature which, subsequent to the occurrence of an abnormal condition against which it is effective to protect a delicate meter, and restoration of operating conditions, may with a minimum of manipulation be restored to its normal state of readiness for further failure in the system.

Another object of the invention is to provide means of the aforesaid nature which shall be positive in operation, inexpensive to maintain, and not in itself subject to damage by the conditions against which it is adapted to protect other equipment.

In carrying out the purposes of the invention, it is proposed to provide a device having two separate compartments adapted for communication respectively with the two sides of the differential meter under protection, said compartments being separated by a flexible diaphragm of sufficient strength to resist the maximum normal operating differential pressure, and to include in said compartments mechanical piercing means activated by an abnormal excess of pressure in either compartment over that in the other to puncture said diaphragm and provide a free passage for fluid whereby the pressures prevailing in the compartments will tend to become mutually equal. It is understood that no novelty attends the use of burstable or frangible diaphragms to permit the escape of fluids when exposed to, or developing, pressures in excess of those attending normal operating conditions; and such devices as depend for their functioning upon the rupture of said diaphragms due solely to fluid pressure acting thereon, and setting up stresses beyond their elastic limit. The present invention is distinguished from the prior art in that a diaphragm is forcibly pierced, punctured, or torn by a concentrated stress mechanically applied to a limited area thereof while the fluid pressure to which said diaphragm is subjected may be far below its yield point.

The nature of the invention, however, will best be understood when described in connection with the accompanying drawings, in which.

Figure 1:
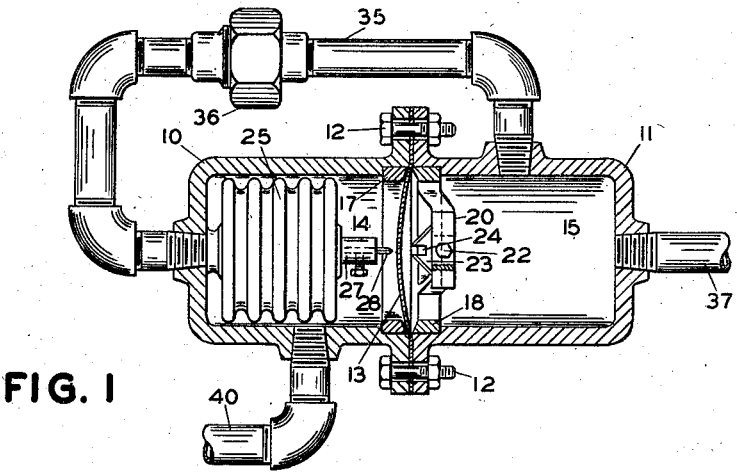
Fig. 1 is a longitudinal section, with interior parts shown in elevation, of a device embodying the principles of the invention.

Referring to the drawings, 10 and 11 designate two similar cup-shaped flanged casings, each having a side opening and an end opening, whereby tubular connections may be made between their interiors and a piping or conduit system, secured together as by bolts 12 passing through their juxtaposed flanges to clamp therebetween a diaphragm 13, thus forming two similar enclosed chambers 14 and 15, sealed and separated from each other by said diaphragm. The diaphragm 13 is formed of thin sheet metal whose properties and proportions are selected in accordance with operating conditions and pressures of the apparatus with which the device is to be used, and also with respect to the nature of the fluid medium to which said diaphragm may be exposed. As an example, it may be said that where pressure differentials between said chambers will not normally exceed 100 inches of water, the diaphragm may be formed of sheet aluminum having a thickness of the order of magnitude of 0.0025 inch. The diaphragm 13 is preferably of dished conformation, and is assembled with its convex face projecting into the chamber 14 whereby to have a predetermined relationship to other elements in said chamber and presently to be described.

Within the inner edges of the flanges upon the casings 10 and 11 are formed rabbets in which are fitted clamping rings 17 and 18, respectively, said rings having juxtaposed faces engaging the diaphragm 13 in clamping relationship, and the latter ring having integral therewith a spider 20 with a central portion somewhat depressed from the plane of clamping engagement with said diaphragm, and having a slot 21 medially located therein. The structure and disposition of the spider 20 will be better understood by reference to Figs. 2 and 3 taken in conjunction with Fig. 1. Positioned in the slot 21, and secured therein, as by a set screw 22, is a piercing member 23 formed of hard sheet metal and having a flat shank portion adapted to be secured within said slot, and a cutting part in the form of a blunt triangle with a slot 24 of width somewhat greater than the thickness of the material of the member 23, whereby the cutting part is provided with two pointed edges. Said edges may, if desired, be further sharpened by bevelling, as indicated in Fig. 2. The proportioning of the spider 20, piercing member 23, and related parts is made such that the cutting edges of said member lie substantially in the plane of clamping of the diaphragm 13 against the ring 18.

Mounted within the casing 10 and occupying a considerable portion of the chamber 14 therein is a bellows member 25 having its interior in communication with the opening in the end wall of said casing and sealed off from said chamber 14. Carried by the free end of the bellows member 25 is a mounting block 27 adapted to receive a piercing member 28 which may be identical in all respects with the hereinbefore-described member 23 and located coaxially therewith. The member 28 is secured to the block 27 by means of a set screw 29 and is disposed with its principal plane perpendicular to that of the member 23, both said planes being perpendicular to the clamping plane upon which the flanges of the casings 10 and 11 engage the edges of the diaphragm 13 and to each other.

Figure 5:
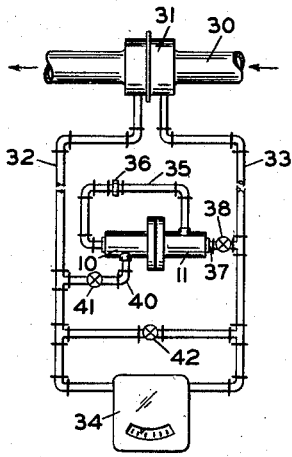
Fig. 5 is a connection diagram, to a reduced scale, showing the invention applied to the protection of a differential fluid meter or manometer.

The manner of connecting the device embodying the principle of the invention into a meter piping system for the purpose of protecting a differential meter will be understood by reference to Fig. 5. A pipe or conduit 30 in which the flow of a fluid is to be determined is provided with an orifice plate retained in a flanged clamping portion 31 having conduits 32 and 33 connected to the opposite sides thereof and to the corresponding ports of a differential meter 34, which may be of any conventional type wherein an index or pointer is caused to take up with respect to a graduated scale a measuring position representative of the pressure differential between said conduits, and therefore of the rate of flow in said pipe or conduit 30. The interior of the bellows member 25 of the protective unit, represented by its casings 10 and 11, is placed in communication with the chamber 15 by means of a pipe 35 (including preferably a union 36 whereby said pipe may readily be separated), said pipe being connected to one of the openings in the wall of the casing 11. The other of said openings has connected thereto a pipe 37 which may be placed in communication with the conduit 33 through a shut-off valve 38. The chamber 14 has in communication therewith a pipe 40 connected thereto through the opening in the side-wall of the casing 10; and said last-named pipe may be connected with the conduit 32 through a shut-off valve 41. A manually actuated by-pass valve 42 connected between the conduits 32, 33 forms a conventional part of such metering systems and provides a means whereby the differential meter may at any time be relieved of the differential pressure across the orifice member 31.

In operation, the piping system is made up as described and in such a manner that the conduit 33 connected through the valve 38 to the chamber 15 is subjected to the higher of the two pressures existing across the orifice of member 31. Upon the valve 42 being closed, the differential pressure across said orifice is applied to the meter 34, whereby is provided a measure of the rate of flow therethrough. The valves 38 and 41 are opened, applying the pressures from the conduits 33 and 32 to the chambers 15 and 14, respectively, the former pressure being applied also to the interior of the bellows member 25. The interior parts are so proportioned and adjusted that, with normal variations of differential pressure corresponding to the operating range of the meter 34, the distortion of the diaphragm is not appreciably changed, the convex face maintaining its projection into the chamber 14. The bellows member 25 carrying internally the same pressure as in the chamber 15, which is normally in excess of that in the chamber 14, will tend to expand, carrying the piercing member 28 toward and into juxtaposition to the convex face of the diaphragm 13 but never under normal operating conditions sufficiently far for said member to come into contact with said face.

In the event of accident—presumably a break in the piping system—bringing about such conditions as may be injurious to the meter 34, these conditions will be represented by an abnormal excess of pressure in one of the conduits 32, 33. Let it first be assumed that a break has occurred on the downstream side of the orifice, as in the connection 32, in which case the pressure in the conduit 30 would be applied through the conduit 33 to one side of the meter 34. Said pressure will also be applied to the interior of chamber 15 and, through the pipe 35, to the interior of bellows member 25.

With the reduction of pressure in the chamber 14 due to its direct communication with the broken conduit 32, the excess pressure in said bellows member will cause the same to expand, bringing the piercing member 28 into engagement with the convex face of the diaphragm 13, which is at the same time forced further into the chamber 14 by the excess pressure prevailing in the chamber 15. The concentrated stress due to the sharp points of the member 28 engaging the material of the diaphragm 13 will cause the latter to be punctured; and, with a diaphragm of suitably selected material, such a puncture, under the influence of the applied fluid pressure, will rapidly develop into a tear, enlarging the opening between the two chambers to such an extent as to render impossible the continuance of any appreciable pressure differential therebetween. If conditions should be such that the piercing member moves further toward the chamber 15 with expansion of the bellows 25, the diaphragm, if not already disintegrated by flow of fluid through the opening therein, will be forced against the piercing member 23 into the slot 24 thereof, the cutting portions of the two piercing members becoming interdigitated to produce a cruciform opening in the diaphragm, which opening under the influence of the escaping fluid will rapidly become enlarged to an extent substantially to eliminate pressure differential between the chambers 15, 14, and correspondingly to reduce the differential across the meter 34.

In the event of the conduit 33 becoming broken, with full pressure remaining in the conduit 32, this pressure, being applied to the chamber 14 and to the convex side of the diaphragm 13 practically unopposed by pressure in the chamber 15, will cause the diaphragm to buckle and be abruptly forced against the cutting edges of the piercing member 23, puncturing the diaphragm as hereinbefore described and permitting it to be ruptured and torn to the extent of opening a free passage between the two chambers and equalizing the pressure across the meter 34.

In the form of the invention as thus far described, it becomes necessary, after the occurrence of a condition resulting in piercing of the diaphragm 13, that the device be disconnected, the piping separated and the bolts 12 removed, to permit separation of the casings 10—11, whereupon the ruptured diaphragm may be removed and replaced by a new unit. As the nature of the first puncture of the diaphragm will be dependent upon that of the initial fault in the piping system, as affecting the first engagement between said diaphragm and a piercing member, examination of the removed diaphragm will in many instances serve as a clue to the trouble and, where the piping has undergone extensive damage, may facilitate identification of the original failure.

Figure 6:
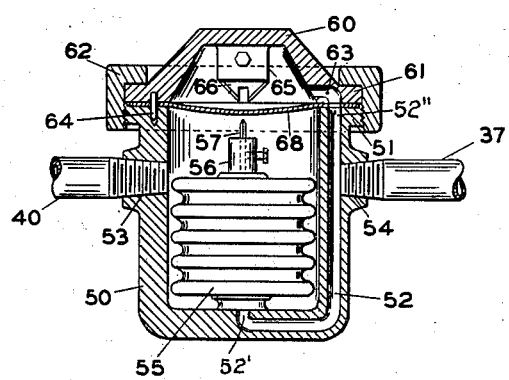
Fig. 6 is a vertical section of a device alternative to that shown in Fig. 1.

In Fig. 6 is shown an improved form of the invention, specially adapted to ready installation and to servicing with a minimum of delay. A cell 50 formed of metal or the like, substantially cylindrical in form, and open at one end is provided with a flanged and threaded rim 51 adapted for engagement by closure means presently to be described. Cored or otherwise formed in the wall of the cell 50, is a passage 52 providing communication between a centrally located opening 52' in the inner end wall of said cell and an opening 52'' on the face of the flanged rim 51. The side walls of the cell 50 are provided with openings 53 and 54 adapted to receive tubular connections, the former providing communication with the interior space of the cell and the latter with the passage 52. Centrally positioned within the cell 50 and having its interior space in communication with the passage 52 through opening 52', is a bellows member 55 carrying on its free end a mounting block 56 adapted to receive a piercing member 57, which parts may be identical in all respects with the corresponding block 27 and member 28 shown in Fig. 1.

A cap member 60 having a flange portion 61 formed to cooperate with the flanged rim 51 of the cell 50 in providing an enclosure is adapted to be maintained in fluid-tight engagement with said cell by the action of an annular clamping nut 62 adapted threadedly to engage the threaded portion of the rim 51 and clampingly to engage the flange portion 61 of said cap member. Formed in the body of the cap member 61 is a short passage 63 communicating with the interior of said cap and with the outlet 52'' of passage 52 in the wall of the cell 50. When assembled, the cap member 60 is definitely located in such an angular position with respect to the cell 50 that said passages 52 and 63 are in positive register, and is maintained in said position by means of dowels 64, one of which appears in Fig. 6. The cap member 60 is recessed to contain a mounting block 65 carrying a piercing member 66 which may be identical with the piercing member 57, the principal planes of said piercing members intersecting at an angle approximating 90 degrees.

Positioned between the flanges 51 and 61 and clamped thereby is a diaphragm 68, of material and construction similar to the diaphragm 13, and having in its rim portion such openings as may be necessary for the dowels 64 as well as to permit free communication between the passages 52 and 63. The diaphragm 68 is dished, and is positioned with its convex face toward the interior of the cell 50, the piercing members 57 and 66 being respectively adjusted so that the former clears the diaphragm surface under the maximum normal operating pressure differential, and the latter terminates approximately in the clamping plane of the flanged rim portions 51 and 61.

Figures 2, 3, 4:
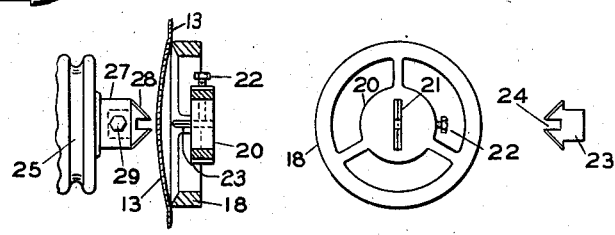
Fig. 2 is a fragmentary bottom plan, partly in transverse section, of certain of the elements shown in Fig. 1.
Figs. 3 and 4 are respectively an elevation of a piercing member and holder and a plan of the piercing member.

In operation, the form of the apparatus shown in Fig. 6 is connected into a metering system substantially identically with that shown in Fig. 1. The pipes 37 and 40 of Fig. 5 would be connected to the openings 54 and 53 respectively, and all other connections would be made identically with those shown in Fig. 5, care being taken that the opening 54 be connected to the "upstream" side of the system, or that side having normally the greater of those two pressures whose differential is to be compared. Under normal conditions, the greater pressure in the cap member 60 will maintain the diaphragm 68 with its convex face projecting into the cell 50 but clearing the piercing member 57. Upon the development of an abnormal excess of said pressure over that within the cell 50, there will take place an action identical with that described in connection with the form of the invention shown in Fig. 1, the cutting edge of the piercing member 57 being forced into the material of the diaphragm 68, puncturing the same and initiating a rupture or tear which will relieve the differential pressure between that within the cell 50 and that within the cap 60. Similarly, in the event of the pressure within the cell becoming excessive, the diaphragm 68 will buckle and will be brought abruptly into engagement with the piercing member 66, with results as hereinbefore described.

For restoration of service after operation of the form of the invention shown in Fig. 6, it is necessary only to close the valves between the device and the piping system, unscrew the clamping nut 62, and remove the cap member 60. This will expose the diaphragm 68 which may readily be removed and replaced by a new unit.

I claim:

1. Over-pressure release device, comprising a casing, a diaphragm separating the casing into two normally non-communicating chambers, together with connections respectively to said chambers for fluid under different pressures, and a first and a second piercing element located respectively upon opposite sides of the diaphragm in the respective chambers, said first element being stationary with respect to said diaphragm and said second element having attached thereto fluid pressure responsive means communicating with the chamber in which said first element is located, to render said second element movable under the influence of pressure prevailing in said last named chamber to pierce the diaphragm when the pressure differential of the pressures prevailing in the respective chambers exceeds a predetermined value, thereby to eliminate substantially the excessive pressure differential.

2. The over-pressure release device as claimed in claim 1, in which the diaphragm is of flexible material.

3. The over-pressure release device as claimed in claim 1, in which the piercing elements are adapted for interdigitated cooperation.

4. Over-pressure release device, comprising a casing, a diaphragm separating the casing into two normally non-communicating chambers, together with connections respectively to said chambers for fluid under different pressures, and pressure responsive means in one of the chambers subject to the pressure in the other chamber and movable in the direction of the separating diaphragm, said means carrying a piercing element to engage and pierce the said diaphragm, when the pressure differential of the pressures prevailing in the respective chambers exceeds a predetermined value, thereby to eliminate substantially the excessive pressure differential.

5. Over-pressure release device, comprising a casing, a flexible diaphragm separating the casing into two non-communicating chambers, together with connections respectively to said two chambers for fluid under different pressures, pressure-responsive means in one of the chambers subject to the pressure in the other chamber and movable in the direction of the separating diaphragm, said means carrying a piercing element to engage and pierce the said diaphragm, when the pressure differential of the pressures prevailing in the respective chambers exceeds a predetermined value, and a stationary piercing element in said other chamber adapted to engage and pierce the said diaphragm when the latter contacts the last-named piercing element upon flexing of the diaphragm under an excessive and reverse pressure differential.

6. Over-pressure release device, comprising a casing, a diaphragm separating the casing into two normally non-communicating chambers, together with connections respectively to said two chambers for fluid under different pressures, and an expansible bellows member in one of the chambers, the interior of said bellows member being connected with the other chamber and the free end of the bellows member being juxtaposed to the separating diaphragm, together with a piercing element secured to said free end adapted to engage and pierce said diaphragm, when the pressure differential of the pressures prevailing in the respective chambers exceeds a predetermined value, thereby to eliminate substantially the excessive pressure differential.

7. Over-pressure release device, comprising a casing including two separable portions, and an intermediate diaphragm, together with removable means to secure the casing portions to each other and the said diaphragm therebetween to separate the casing into two normally non-communicating chambers, connections being provided respectively to said two chambers for fluid under different pressures, and a first and a second piercing element located respectively upon opposite sides of the diaphragm in the respective chambers, said first element being stationary with respect to said diaphragm and said second element having attached thereto fluid pressure responsive means communicating with the chamber in which said first element is located, to render said second element movable under the influence of pressure prevailing in said last named chamber to pierce the diaphragm when the pressure differential of the pressures prevailing in the respective chambers exceeds a predetermined value, thereby to eliminate substantially the excessive pressure differential.

JOHN W. BEECHER.

REFERENCES CITED

The following references are of record in the file of this patent:

UNITED STATES PATENTS

| Number | Name | Date |
|---|---|---|
| 1,951,897 | Binckley | Mar. 20, 1934 |
| 2,225,220 | Huff | Dec. 17, 1940 |
| 2,320,211 | Bloom et al. | May 25, 1943 |
| 2,374,523 | Beecher | Apr. 24, 1945 |
| 2,410,310 | Smith | Oct. 29, 1946 |

FOREIGN PATENTS

| Number | Country | Date |
|---|---|---|
| 318,550 | Germany | Feb. 10, 1920 |